US012787690B2

(12) United States Patent
Mizuguchi et al.

(10) Patent No.: US 12,787,690 B2
(45) Date of Patent: Nov. 3, 2026

(54) SUBSTRATE PROCESSING APPARATUS, APPARATUS START-UP METHOD, METHOD OF MANUFACTURING SEMICONDUCTOR DEVICE, AND RECORDING MEDIUM FOR DETERMINING THE NEED FOR AUTHENTICATION AT START-UP OF A CONTROLLER OF THE SUBSTRATE PROCESSING APPARATUS

(71) Applicant: KOKUSAI ELECTRIC CORPORATION, Tokyo (JP)

(72) Inventors: Yasuhiro Mizuguchi, Toyama (JP); Kyohei Matsuda, Toyama (JP); Ichiro Nunomura, Toyama (JP); Kaori Inoshima, Toyama (JP)

(73) Assignee: KOKUSAI ELECTRIC CORPORATION, Tokyo (JP)

( * ) Notice: Subject to any disclaimer, the term of this patent is extended or adjusted under 35 U.S.C. 154(b) by 810 days.

(21) Appl. No.: 18/124,294

(22) Filed: Mar. 21, 2023

(65) Prior Publication Data

US 2023/0326771 A1 Oct. 12, 2023

(30) Foreign Application Priority Data

Apr. 7, 2022 (JP) ................................ 2022-063994

(51) Int. Cl.
*H10P 72/00* (2026.01)
*G05B 19/048* (2006.01)
(Continued)

(52) U.S. Cl.
CPC ........ *H10P 72/0604* (2026.01); *G05B 19/048* (2013.01); *G06F 21/31* (2013.01); *G06F 21/46* (2013.01); *G05B 2219/2602* (2013.01)

(58) Field of Classification Search
CPC ...... H10P 72/0604; G06F 21/31; G06F 21/46; H04L 12/66; G05B 19/048; G05B 2219/2602
See application file for complete search history.

(56) References Cited

U.S. PATENT DOCUMENTS

2002/0129284 A1* 9/2002 Kobayashi .............. G06F 21/31 726/5
2002/0143422 A1* 10/2002 Seta ................. G05B 19/41865 700/104
(Continued)

FOREIGN PATENT DOCUMENTS

CN 101019207 A 8/2007
CN 102004676 A 4/2011
(Continued)

OTHER PUBLICATIONS

Taiwan Office Action issued on Sep. 19, 2023 for Taiwan Patent Application No. 112105088.
(Continued)

*Primary Examiner* — Rami R Okasha
(74) *Attorney, Agent, or Firm* — Volpe Koenig

(57) ABSTRACT

There is provided a technique that includes a process chamber configured to be capable of processing a substrate; a main controller configured to be capable of controlling the processing of the substrate; a storage configured to be capable of storing start-up condition execution status information used to determine whether or not a start-up condition is executed when the main controller is started, start-up condition management information for managing the start-up condition, and a state of the start-up condition management information; and a start-up condition controller configured to be capable of validating the start-up condition execution status information when the start-up condition
(Continued)

management information satisfies a predetermined condition.

20 Claims, 13 Drawing Sheets

(51) Int. Cl.
*G06F 21/31* (2013.01)
*G06F 21/46* (2013.01)

(56) References Cited

U.S. PATENT DOCUMENTS

| | | | | |
|---|---|---|---|---|
| 2006/0278701 | A1 | 12/2006 | Matsushita et al. | |
| 2007/0272151 | A1 | 11/2007 | Suzuki et al. | |
| 2011/0055438 | A1 | 3/2011 | Nakagawa | |
| 2014/0316602 | A1* | 10/2014 | Kawai | G05F 1/66 700/297 |
| 2017/0364360 | A1* | 12/2017 | Bessegato | B25F 5/00 |
| 2018/0165438 | A1* | 6/2018 | Ogino | G06F 21/32 |
| 2019/0180010 | A1* | 6/2019 | Ryu | H04L 9/3226 |
| 2019/0221460 | A1* | 7/2019 | Mizuguchi | H01L 21/67167 |
| 2021/0150004 | A1* | 5/2021 | Watanabe | G06F 21/604 |
| 2022/0253311 | A1* | 8/2022 | Batapati | G06F 9/4881 |

FOREIGN PATENT DOCUMENTS

| | | | |
|---|---|---|---|
| JP | 2006-344112 | A | 12/2006 |
| TW | 200625389 | A | 7/2006 |
| TW | 201108098 | A | 3/2011 |
| WO | 2016/098887 | A1 | 6/2016 |
| WO | 2016/111352 | A1 | 7/2016 |

OTHER PUBLICATIONS

Chinese Office Action issued on Mar. 28, 2026 for Chinese Patent Application No. 202310282578.X.

* cited by examiner

SUBSTRATE PROCESSING APPARATUS, APPARATUS START-UP METHOD, METHOD OF MANUFACTURING SEMICONDUCTOR DEVICE, AND RECORDING MEDIUM FOR DETERMINING THE NEED FOR AUTHENTICATION AT START-UP OF A CONTROLLER OF THE SUBSTRATE PROCESSING APPARATUS

CROSS-REFERENCE TO RELATED APPLICATION

This application is based upon and claims the benefit of priority from Japanese Patent Application No. 2022-063994, filed on Apr. 7, 2022, the entire contents of which are incorporated herein by reference.

TECHNICAL FIELD

The present disclosure relates to a substrate processing apparatus, an apparatus start-up method, a method of manufacturing a semiconductor device, and a recording medium.

BACKGROUND

For example, when a substrate processing apparatus used in a process of manufacturing a semiconductor device is started to communicate with a management device, which manages connection of a plurality of substrate processing apparatuses, based on the SEMI standard, if the substrate processing apparatus attempts to connect to the management device that is not recognized by the substrate processing apparatus, a method of performing authentication using a password has been disclosed. The substrate processing apparatus can be managed by performing the password authentication when connecting to the management device.

When the substrate processing apparatus is connected to a new management device, there is a concern that the setting of the substrate processing apparatus may not correspond to the new management device, and further, it is conceivable that an unfamiliar and inexperienced operator may perform an erroneous operation, resulting in inefficient setup of the substrate processing apparatus.

SUMMARY

Some embodiments of the present disclosure provide a technique that prevents an unfamiliar operator from performing an erroneous operation when a substrate processing apparatus is connected to a new management device, to enable efficient setup of the substrate processing apparatus.

According to one embodiment of the present disclosure, there is provided a technique that includes a process chamber configured to be capable of processing a substrate; a main controller configured to be capable of controlling the processing of the substrate; a storage configured to be capable of storing start-up condition execution status information used to determine whether or not a start-up condition is executed when the main controller is started, start-up condition management information for managing the start-up condition, and a state of the start-up condition management information; and a start-up condition controller configured to be capable of validating the start-up condition execution status information when the start-up condition management information satisfies a predetermined condition.

BRIEF DESCRIPTION OF DRAWINGS

The accompanying drawings, which are incorporated in and constitute a part of the specification, illustrate embodiments of the present disclosure.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Hereinafter, embodiments of the present disclosure will be described.

First Embodiment

First, a first embodiment of the present disclosure will be described with reference to the drawings.

(1) Configuration of System Including Substrate Processing Apparatus

Figure 1:
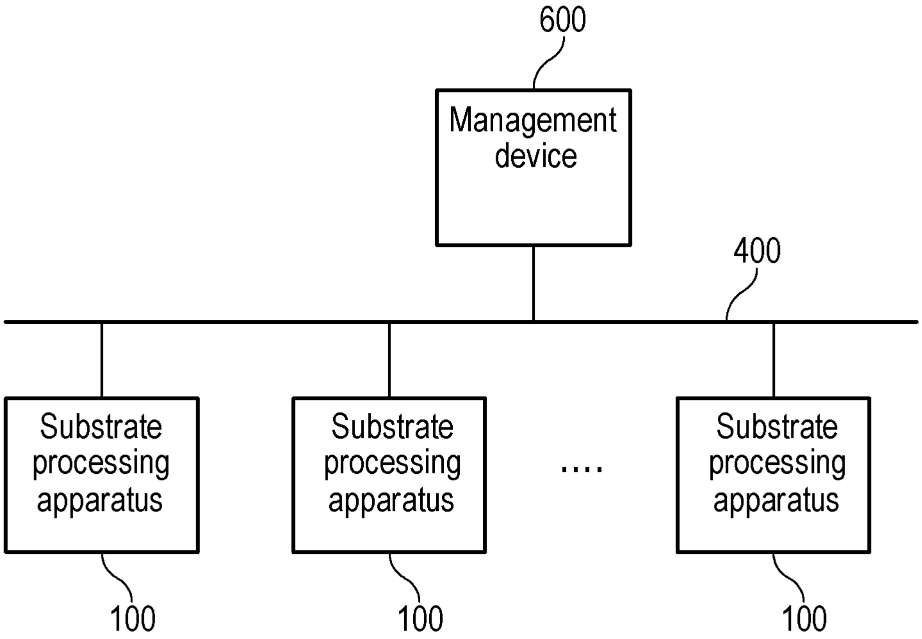
FIG. 1 is a schematic configuration diagram of a system including a substrate processing apparatus according to embodiments of the present disclosure.

The configuration of a system including a substrate processing apparatus according to embodiments of the present disclosure will be described with reference to FIG. 1. FIG. 1 is a schematic configuration diagram of a system including a substrate processing apparatus according to embodiments of the present disclosure.

As shown in FIG. 1, the system includes at least one substrate processing apparatus 100 and a management device 600 connected to the substrate processing apparatus 100 to be capable of controlling a substrate of the substrate processing apparatus. The substrate processing apparatus 100 is configured to execute a processing process based on a recipe in which processing procedures and process conditions are defined. The substrate processing apparatus 100 and the management device 600 are connected by a network 400 such as a local area network (LAN) or a wide area network (WAN).

(2) Configuration of Substrate Processing Apparatus

Figure 2:
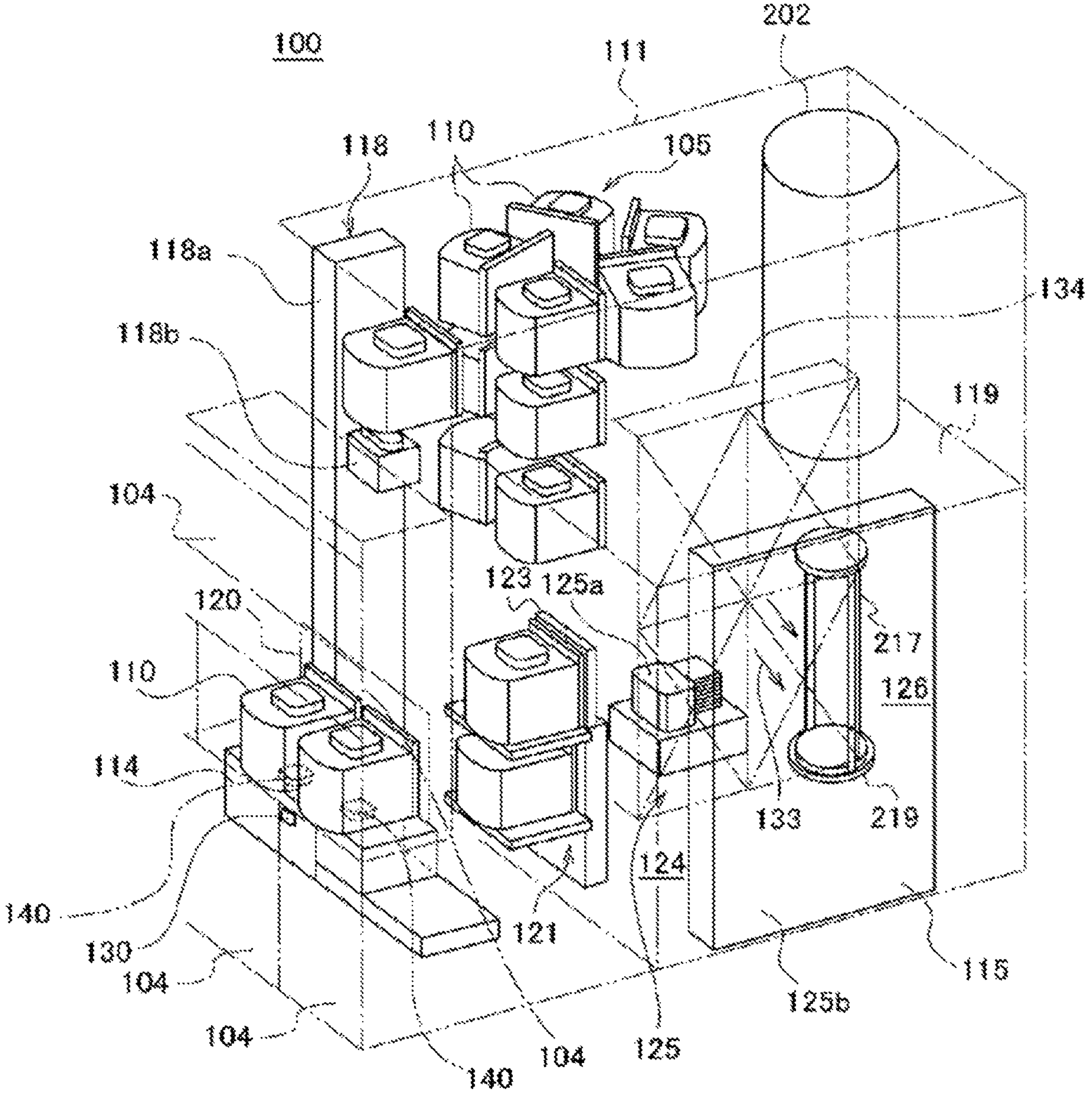
FIG. 2 is a perspective view of a substrate processing apparatus according to embodiments of the present disclosure.
Figure 3:
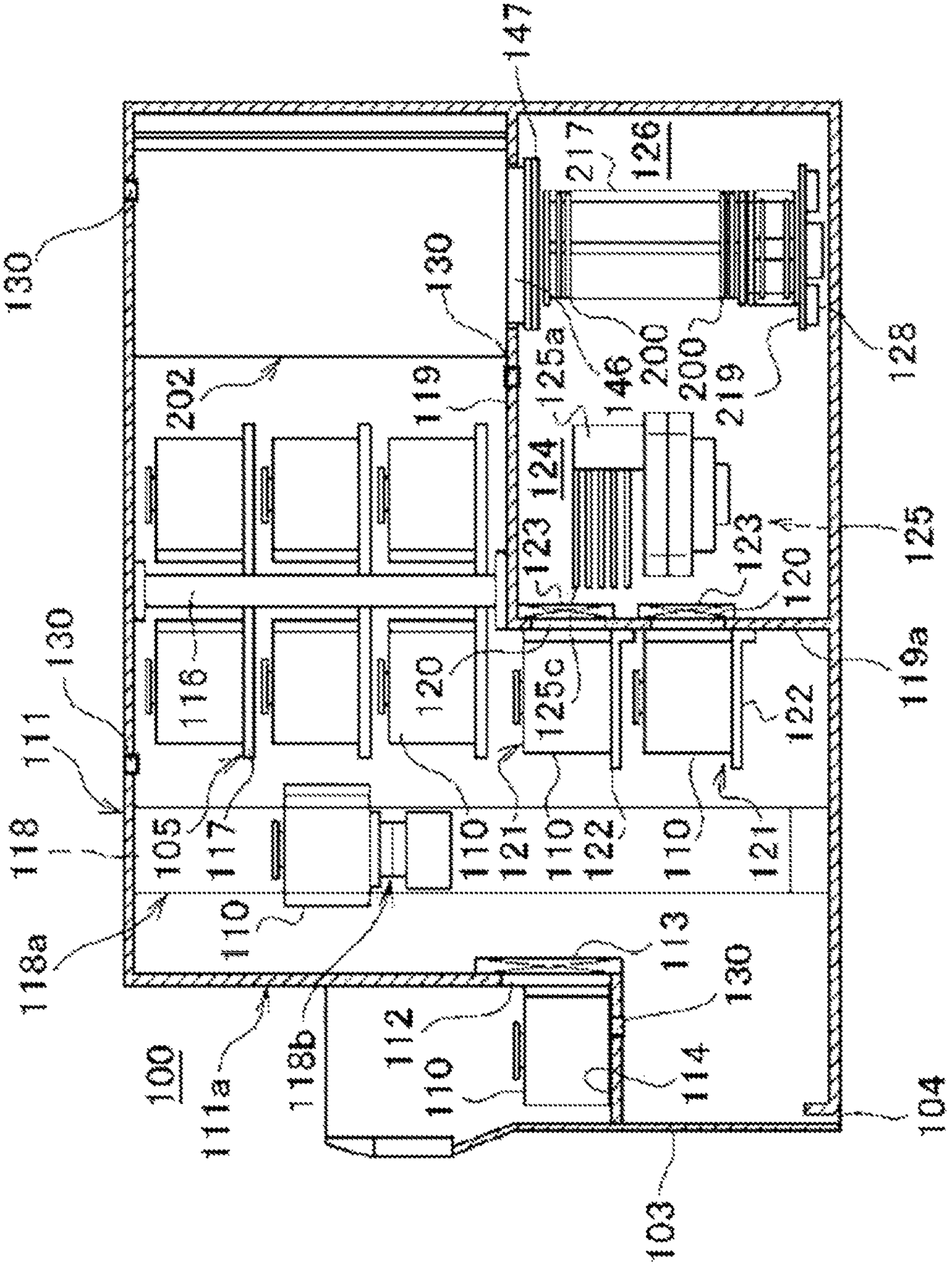
FIG. 3 is a side perspective view of a substrate processing apparatus according to embodiments of the present disclosure.

Subsequently, the configuration of the substrate processing apparatus 100 according to the embodiments of the present disclosure will be described with reference to FIGS. 2 and 3. FIG. 2 is a perspective view of the substrate processing apparatus according to the embodiments of the present disclosure. FIG. 3 is a side perspective view of the substrate processing apparatus according to the embodiments of the present disclosure. The substrate processing apparatus 100 according to the present embodiment is configured as a vertical apparatus that performs an oxidation process, a diffusion process, a CVD process, and the like on a substrate such as a wafer.

As shown in FIGS. 2 and 3, the substrate processing apparatus 100 according to the present embodiment includes a housing 111 configured as a pressure-resistant container. A front maintenance opening 103 as an opening provided for maintenance is opened in the forward front portion of a front wall 111*a* of the housing 111. The front maintenance opening 103 is provided with a pair of front maintenance doors 104 as an entrance mechanism for opening/closing the front maintenance opening 103. A pod (substrate container) 110 containing a wafer (substrate) 200 of silicon or the like is used as a carrier for transferring the wafer 200 into/out of the housing 111.

A pod loading/unloading port (substrate container loading/unloading port) 112 is opened in the front wall 111*a* of the housing 111 so as to communicate the inside and outside of the housing 111. The pod loading/unloading port 112 is opened/closed by a front shutter (substrate container loading/unloading port opening/closing mechanism) 113. A load port (substrate container delivery table) 114 is installed as a mounting table on the forward front side of the pod loading/unloading port 112. A pod 110 is configured to be mounted and aligned on the load port 114. The pod 110 is configured to be transferred onto the load port 114 by an in-process transfer device (not shown) such as an OHT (Overhead Hoist Transport).

A rotary pod shelf (substrate container mounting shelf) 105 is installed in the upper portion of the housing 111 at substantially the central portion in the front-rear direction. A plurality of pods 110 is configured to be stored on the rotary pod shelf 105. The rotary pod shelf 105 has a post 116 that is vertically erected and intermittently rotated in a horizontal plane, and a plurality of shelf boards (substrate container mounting tables) 117 that is radially supported at respective positions of the upper, middle, and lower stages of the post 116. The plurality of shelf boards 117 is configured to mount and hold the plurality of pods 110, respectively.

A pod transfer device (substrate container transfer device) 118 is installed between the load port 114 and the rotary pod shelf 105 in the housing 111. The pod transfer device 118 includes a pod elevator (substrate container elevating mechanism) 118*a* capable of moving up and down while holding the pod 110, and a pod transfer mechanism (substrate container transfer mechanism) 118*b* as a transfer mechanism. The pod transfer device 118 is configured to transfer the pod 110 between the load port 114, the rotary pod shelf 105, and a pod opener (substrate container lid opening/closing mechanism) 121 by continuous operation of the pod elevator 118*a* and the pod transfer mechanism 118*b*.

A sub-housing 119 is provided in the lower portion of the housing 111 from substantially the central portion in the front-rear direction of the housing 111 to the rear end thereof. A pair of wafer loading/unloading ports (substrate loading/unloading ports) 120 for transferring the wafer 200 into/out of the sub-housing 119 is arranged vertically in two stages of an upper stage and a lower stage on a front wall 119*a* of the sub-housing 119. The pod opener 121 is installed at each of the wafer loading/unloading ports 120 on the upper and lower stages.

Each pod opener 121 includes a pair of mounting tables 122 on which the pod 110 is mounted, and a cap attaching/detaching mechanism (lid attaching/detaching mechanism) 123 for attaching/detaching a cap (lid) of the pod 110. The pod opener 121 is configured to open/close a wafer entrance of the pod 110 by attaching/detaching the cap of the pod 110 mounted on the mounting table 122 by the cap attaching/detaching mechanism 123.

A transfer chamber 124 that is fluidly isolated from a space in which the pod transfer device 118, the rotary pod shelf 105, and the like are installed is constituted in the sub-housing 119. A wafer transfer mechanism (substrate transfer mechanism) 125 is installed in the front region of the transfer chamber 124. The wafer transfer mechanism 125 is composed of a wafer transfer device (substrate transfer device) 125*a* that can rotate or linearly move the wafer 200 in the horizontal direction, and a wafer transfer device elevator (substrate transfer device elevating mechanism) 125*b* for raising and lowering the wafer transfer device 125*a*. As shown in FIG. 2, the wafer transfer device elevator 125*b* is installed between the right end portion of the front region of the transfer chamber 124 of the sub-housing 119 and the right end portion of the housing 111. The wafer transfer device 125*a* includes tweezers (substrate holder) 125*c* as a mounting portion for the wafer 200. By continuous operation of the wafer transfer device elevator 125*b* and the wafer transfer device 125*a*, the wafer 200 can be loaded (charged) and unloaded (discharged) into and from a boat (substrate holder) 217.

A standby part 126 for accommodating the boat 217 to be put on standby is configured in the rear region of the transfer chamber 124. A process furnace 202 is installed above the standby part 126. The lower end portion of the process furnace 202 is configured to be opened/closed by a furnace opening shutter (furnace opening/closing mechanism) 147.

As shown in FIG. 2, a boat elevator (substrate holder elevating mechanism) 115 for raising and lowering the boat 217 is installed between the right end portion of the standby part 126 of the sub-housing 119 and the right end portion of the housing 111. An arm 128 as a connecting member is connected to an elevating stand of the boat elevator 115. A seal cap 219 as a lid is horizontally installed on the arm 128. The seal cap 219 is configured to vertically support the boat 217 so as to be capable of sealing the lower end portion of the process furnace 202.

A substrate transfer system according to the present embodiment mainly includes the rotary pod shelf 105, the boat elevator 115, the pod transfer device (substrate container transfer device) 118, the wafer transfer mechanism (substrate transfer mechanism) 125, the boat 21, and a rotation mechanism 254 which will be described later. The rotary pod shelf 105, boat elevator 115, pod transfer device (substrate container transfer device) 118, wafer transfer mechanism (substrate transfer mechanism) 125, boat 217, and rotation mechanism 254 are electrically connected to a transfer controller 11 as a sub-controller to be described later.

The boat 217 includes a plurality of holding members. The boat 217 is configured to hold a plurality of wafers 200 (for example, about 50 to 125 wafers) horizontally, which are arranged in the vertical direction with their centers aligned with one another.

As shown in FIG. 2, a clean unit 134 is installed in the left end portion of the transfer chamber 124 opposite to the wafer transfer device elevator 125*b* side and the boat elevator 115 side. The clean unit 134 is composed of a supply fan and a dust-proof filter so as to supply clean air 133 which is a cleaned atmosphere or an inert gas. A notch alignment device (not shown) as a substrate matching device for matching the position of the wafer in the circumferential direction is installed between the wafer transfer device 125*a* and the clean unit 134.

The clean air 133 blown out from the clean unit 134 circulates around the notch alignment device (not shown), the wafer transfer device 125*a*, and the boat 217 in the standby part 126, and then is sucked by a duct (not shown) and exhausted to the outside of the housing 111 or is circulated to the primary side (supply side) which is the suction side of the clean unit 134 and then blown out again into the transfer chamber 124 by the clean unit 134.

A plurality of apparatus covers (not shown) as a mechanism for entering the substrate processing apparatus 100 are attached to the outer periphery of the housing 111 and the sub-housing 119. These apparatus covers are configured to be separated during maintenance work so that a maintenance personnel can enter the substrate processing apparatus 100. A door switch 130 as an entrance sensor is installed at the end portions of the housing 111 and the sub-housing 119 facing these apparatus covers. A door switch 130 as an entrance sensor is also installed at the end portion of the housing 111 facing the front maintenance door 104. A substrate detection sensor 140 for detecting the mount of the pod 110 is also installed on the load port 114. The switches and sensors 15 such as the door switch 130 and substrate detection sensor 140 are electrically connected to a substrate processing apparatus controller 240 which will be described later.

(3) Operation of Substrate Processing Apparatus

Next, the operation of the substrate processing apparatus 100 according to the present embodiment will be described with reference to FIGS. 2 and 3.

As shown in FIGS. 2 and 3, when the pod 110 is supplied to the load port 114 by the in-process transfer device (not shown), the pod 110 is detected by the substrate detection sensor 140 and the pod loading/unloading port 112 is opened by the front shutter 113. Then, the pod 110 on the load port 114 is loaded into the housing 111 from the pod loading/unloading port 112 by the pod transfer device 118.

The pod 110 loaded into the housing 111 is automatically transferred by the pod transfer device 118 onto the shelf board 117 of the rotary pod shelf 105 and is temporarily stored in the shelf board 117. Thereafter, the pod 110 is transferred from the shelf board 117 onto the mounting table 122 of one pod opener 121. The pod 110 loaded into the housing 111 may be directly transferred onto the mounting table 122 of the pod opener 121 by the pod transfer device 118. At this time, the wafer loading/unloading port 120 of the pod opener 121 is closed by the cap attaching/detaching mechanism 123, and the clean air 133 is circulated and filled in the transfer chamber 124. For example, a nitrogen gas as the clean air 133 is filled in the transfer chamber 124, so that an oxygen concentration is set to 20 ppm or less, which is much lower than the oxygen concentration of the interior (air atmosphere) of the housing 111.

The opening side end face of the pod 110 mounted on the mounting table 122 is pressed against the opening edge of the wafer loading/unloading port 120 on the front wall 119*a* of the sub-housing 119, and the cap of the pod 110 is separated by the cap attaching/detaching mechanism 123 and the wafer entrance is opened. After that, the wafer 200 is picked up from the pod 110 by the tweezers 125*c* of the wafer transfer device 125*a* through the wafer entrance, is aligned in orientation by the notch alignment device, is loaded into the standby part 126 at the rear of the transfer chamber 124, and then is charged into the boat 217. The wafer transfer device 125*a* that has charged the wafer 200 into the boat 217 returns to the pod 110, and charges the next wafer 200 into the boat 217.

During the charging work of the wafer 200 into the boat 217 by the wafer transfer mechanism 125 in one (upper or lower) pod opener 121, another pod 110 is transferred by the pod transfer device 118 from the rotary pod shelf 105 to the mounting table 122 of the other (lower or upper) pod opener 121, so that the opening work of the pod 110 by the pod opener 121 is simultaneously performed.

When a predetermined number of wafers 200 are charged into the boat 217, the lower end portion of the process furnace 202 closed by the furnace opening shutter 147 is opened by the furnace opening shutter 147. Subsequently, the boat 217 holding the group of wafers 200 is loaded into the process furnace 202 by raising the seal cap 219 by the boat elevator 115.

After the boat loading, an arbitrary process is performed on the wafers 200 in the process furnace 202. After the process, according to substantially the reverse procedure of the above-described procedure, except for a wafer alignment step in the notch alignment device 135, the boat 217 storing the processed wafers 200 is unloaded from the process chamber 201, and the pod 110 storing the processed wafers 200 is unloaded out of the housing 111.

(4) Configuration of Process Furnace

Figure 4:
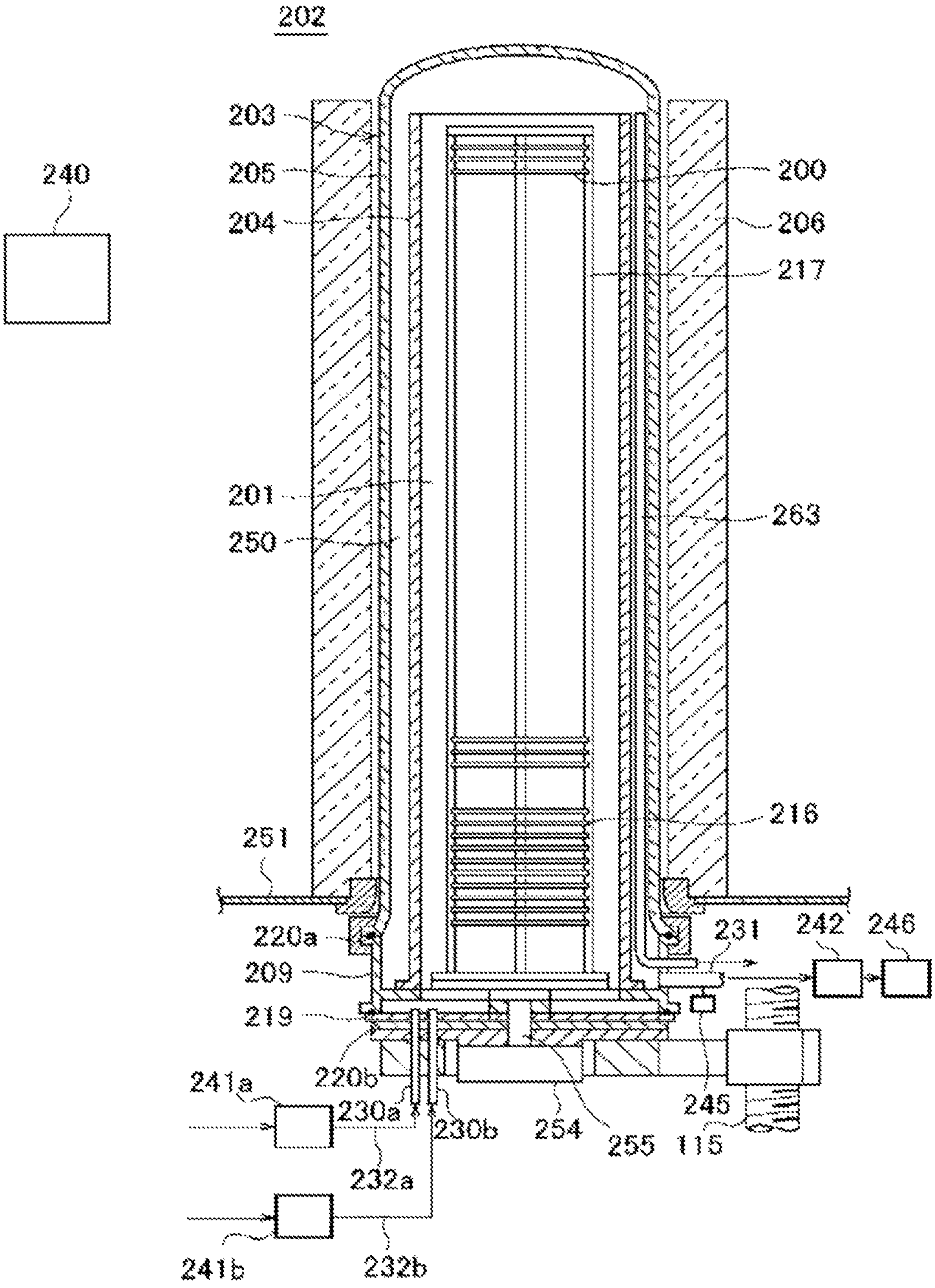
FIG. 4 is a longitudinal cross-sectional view of a process furnace of a substrate processing apparatus according to embodiments of the present disclosure.

Subsequently, the configuration of the process furnace 202 according to the present embodiment will be described with reference to FIG. 4. FIG. 4 is a longitudinal sectional view of the process furnace 202 of the substrate processing apparatus 100 according to embodiments of the present disclosure.

As shown in FIG. 4, the process furnace 202 includes a process tube 203 as a reaction tube. The process tube 203 includes an inner tube 204 as an internal reaction tube and an outer tube 205 as an external reaction tube installed outside the inner tube 204. The inner tube 204 is made of a heat resistant material such as quartz ($SiO_2$) or silicon carbide (SiC). The inner tube 204 is formed in a cylindrical shape with its upper and lower ends opened. A process chamber 201 for processing a wafer 200 as a substrate is formed in a cylindrical hollow portion of the inner tube 204. The interior of the process chamber 201 is configured to be capable of accommodating a boat 217 which will be described later. The outer tube 205 is installed to be concentric with the inner tube 204. The outer tube 205 has an inner diameter larger than the outer diameter of the inner tube 204 and is formed in a cylindrical shape with its upper end closed and its lower end opened. The outer tube 205 is made of a heat resistant material such as quartz or silicon carbide.

A heater 206 as a heating mechanism is installed outside the process tube 203 so as to surround a sidewall surface of the process tube 203. The heater 206 is configured in a cylindrical shape. The heater 206 is supported by a heater base 251 as a support plate so as to be installed vertically.

A manifold 209 is arranged below the outer tube 205 so as to be concentric with the outer tube 205. The manifold 209 is made of, for example, stainless steel. The manifold 209 is formed in a cylindrical shape with its upper and lower ends opened. The manifold 209 engages with the lower end portion of the inner tube 204 and the lower end portion of the outer tube 205, respectively. The manifold 209 is installed to support the lower end portion of the inner tube 204 and the lower end portion of the outer tube 205. An O-ring 220*a* as a seal member is installed between the manifold 209 and the outer tube 205. As the manifold 209 is supported by the heater base 251, the process tube 203 is vertically installed. A reaction container is formed by the process tube 203 and the manifold 209.

A process gas nozzle 230*a* and a purge gas nozzle 230*b* as gas introduction parts are connected to the seal cap 219 to be described later so as to communicate with the interior of the process chamber 201. A process gas supply pipe 232*a* is connected to the process gas nozzle 230*a*. A process gas supply source (not shown) and the like are connected to the upstream side of the process gas supply pipe 232*a* (the side opposite to the connection side with the process gas nozzle 230*a*) via a mass flow controller (MFC) 241*a* as a gas flow controller. A purge gas supply pipe 232*b* is connected to the purge gas nozzle 230*b*. A purge gas supply source (not shown) and the like are connected to the upstream side of the purge gas supply pipe 232*b* (the side opposite to the connection side with the purge gas nozzle 230*b*) via a mass flow controller (MFC) 241*b* as a gas flow controller.

A process gas supply system according to the present embodiment mainly includes the process gas supply source (not shown), the MFC 241*a*, the process gas supply pipe 232*a*, and the process gas nozzle 230*a*. A purge gas supply system according to the present embodiment mainly includes the purge gas supply source (not shown), the MFC 241*b*, the purge gas supply pipe 232*b*, and the purge gas nozzle 230*b*. A gas supply system according to the present embodiment mainly includes the process gas supply system and the purge gas supply system. A gas supply controller 14 as a sub-controller, which will be described later, is electrically connected to the MFCs 241*a* and 241*b*.

In the manifold 209, an exhaust pipe 231 for exhausting the internal atmosphere of the process chamber 201 is installed. The exhaust pipe 231 is arranged at the lower end portion of a tubular space 250 formed by a gap between the inner tube 204 and the outer tube 205. The exhaust pipe 231 communicates with the tubular space 250. A pressure sensor 245 as a pressure detector, a pressure regulator 242 configured as, for example, an auto pressure controller (APC), and a vacuum exhaust device 246 such as a vacuum pump are connected to the downstream side of the exhaust pipe 231 (the side opposite to the connection side with the manifold 209) sequentially from the upstream side. A gas exhaust system according to the present embodiment mainly includes the exhaust pipe 231, the pressure sensor 245, and the pressure regulator 242. A pressure controller 13 as a sub-controller, which will be described later, is electrically connected to the pressure regulator 242 and the pressure sensor 245. The vacuum exhaust device 246 may be included in the gas exhaust system.

The seal cap 219 as a furnace opening cover capable of hermetically closing the lower end opening of the manifold 209 is installed below the manifold 209. The seal cap 219 abuts against the lower end of the manifold 209 from below in the vertical direction. The seal cap 219 is made of, for example, metal such as stainless steel. The seal cap 219 is formed in a disc shape. An O-ring 220*b* is installed on the upper surface of the seal cap 219 as a seal member that contacts the lower end of the manifold 209.

The rotation mechanism 254 for rotating the boat is installed near the central portion of the seal cap 219 and on the side opposite to the process chamber 201. A rotary shaft 255 of the rotation mechanism 254 penetrates the seal cap 219 and supports the boat 217 from below. The rotation mechanism 254 is configured to be capable of rotating the wafer 200 by rotating the boat 217.

The seal cap 219 is configured to be vertically raised and lowered by the boat elevator 115 as a substrate holder elevating mechanism installed vertically outside the process tube 203. The boat 217 is configured to be capable of being transferred into/out of the process chamber 201 by raising and lowering the seal cap 219. The rotation mechanism 254 and the boat elevator 115 are electrically connected to the transfer controller 11 as a sub-controller which will be described later.

As described above, the boat 217 as the substrate holder is configured to align and hold a plurality of wafers 200 in a horizontal posture and in multiple stages with their centers aligned with one another. The boat 217 is made of, for example, a heat resistant material such as quartz or silicon carbide. A plurality of heat insulating plates 216 as heat insulating members is arranged in a horizontal posture and in multiple stages in the lower portion of the boat 217. The heat insulating plates 216 are formed in a disc shape. The heat insulating plates 216 are made of, for example, a heat resistant material such as quartz or silicon carbide. The heat insulating plates 216 are configured to make it difficult for heat from the heater 206 to be transferred to the manifold 209 side.

A temperature sensor 263 as a temperature detector is installed in the process tube 203. A heating mechanism according to the present embodiment mainly includes the heater 206 and the temperature sensor 263. The heater 206 and the temperature sensor 263 are electrically connected to a temperature controller 12 as a sub-controller which will be described later.

A substrate processing system according to the present embodiment mainly includes the gas exhaust system, the gas supply system, and the heating mechanism.

(5) Operation of Process Furnace

Subsequently, as a process of manufacturing a semiconductor device, a method of forming a thin film on a wafer 200 by a CVD method using the process furnace 202 having the above configuration will be described with reference to FIG. 4. In the following description, the operation of each part constituting the substrate processing apparatus 100 is controlled by the substrate processing apparatus controller 240.

When a plurality of wafers 200 is charged into the boat 217 (wafer charge), as shown in FIG. 4, the boat 217 holding the plurality of wafers 200 is lifted by the boat elevator 115 and is loaded into the process chamber 201 (boat loading).

In this state, the seal cap 219 seals the lower end of the manifold 209 via the O-ring 220*b*.

The interior of the process chamber 201 is vacuum-exhausted by the vacuum exhaust device 246 so as to have a desired pressure (degree of vacuum). At this time, based on a pressure value measured by the pressure sensor 245, the degree of opening of the valve of the pressure regulator 242 is feedback-controlled. Further, the interior of the process chamber 201 is heated by the heater 206 so as to reach a desired temperature. At this time, based on a temperature value detected by the temperature sensor 263, the amount of electric power supplied to the heater 206 is feedback-controlled. Subsequently, the boat 217 and the wafers 200 are rotated by the rotation mechanism 254.

Next, a process gas, which is supplied from the process gas supply source and controlled by the MFC 241*a* to have a desired flow rate, flows through the process gas supply pipe 232*a* and is introduced into the process chamber 201 from the nozzle 230*a*. The introduced process gas rises in the process chamber 201, flows out into the tubular space 250 through the upper end opening of the inner tube 204, and is exhausted through the exhaust pipe 231. As the gas passes through the process chamber 201, it contacts the surfaces of the wafers 200, and at this time, a thin film is deposited on the surfaces of the wafers 200 by a thermal CVD reaction.

After a preset processing time has passed, a purge gas, which is supplied from the purge gas supply source and controlled by the MFC 241*b* to have a desired flow rate, is supplied into the process chamber 201, and the interior of the process chamber 201 is substituted with an inert gas and the internal pressure of the process chamber 201 is returned to the normal pressure.

After that, the seal cap 219 is lowered by the boat elevator 115, and the lower end of the manifold 209 is opened and the boat 217 holding the processed wafers 200 is unloaded from the lower end of the manifold 209 to the outside of the process tube 203 (boat unloading). Thereafter, the processed wafers 200 are taken out from the boat 217 and are stored in the pod 110 (wafer discharge).

(6) Configuration of Substrate Processing Apparatus Controller (Main Controller)

Figure 5:
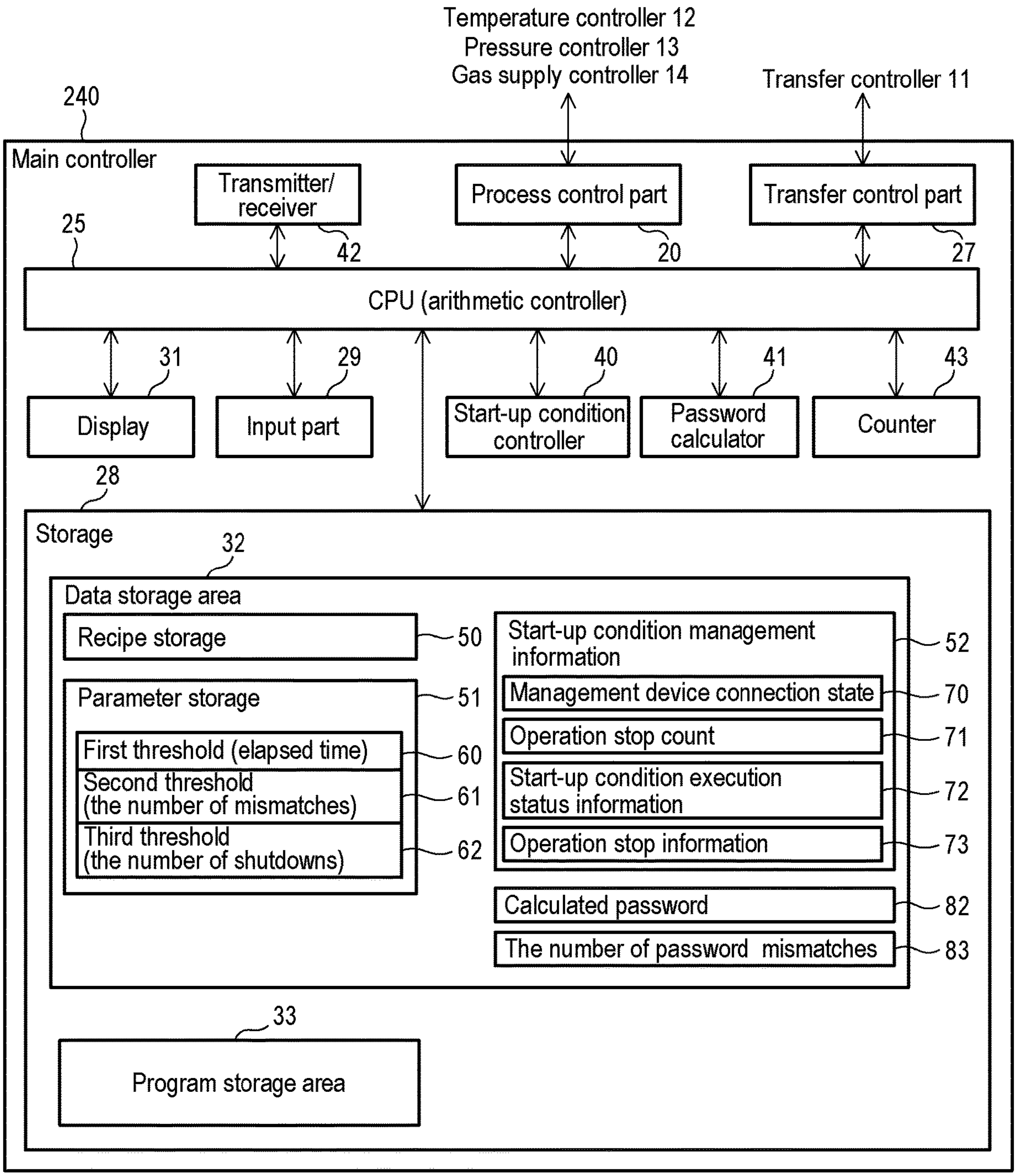
FIG. 5 is a block configuration diagram of a main controller included in a substrate processing apparatus according to embodiments of the present disclosure.

A controller (hereinafter also referred to as a main controller) 240 as the substrate processing apparatus controller will be described below with reference to FIG. 5.

The main controller 240 mainly includes a central processing unit (CPU) 25 as an arithmetic controller, a process control part 20 for controlling a process controller, a transfer control part 27 for controlling the transfer controller 11, a transmitter/receiver 42 for communicating with the management device 600, a storage 28 composed of a memory such as a RAM and a ROM, a HDD, and the like, an input part 29 such as a mouse or a keyboard, a display 31 such as a monitor, a start-up condition controller 40 for controlling start-up condition execution status information 72 used to determine whether or not the start-up condition is executed when the main controller 240 is started up, a password calculator 41 for calculating a password when the start-up condition controller 40 determines that password authentication is required, and a counter 43 for counting the number of times of operation stop of the main controller 240 and the number of mismatches when entering a password. The CPU 25, the storage 28, the input part 29, the display 31, the start-up condition controller 40, the password calculator 41, the counter 43, and a clock function (not shown) constitute an operation part capable of setting data.

The CPU 25 constitutes a core of the main controller 240, executes a control program stored in a ROM (not shown), and executes recipes (for example, a process recipe as a substrate process recipe) stored in the storage 28, which also constitutes a recipe storage 50, according to instructions from the display 31. The ROM is composed of an EEPROM, a flash memory, a hard disk, etc., and is a recording medium for storing an operation program for the CPU 25, and the like. The memory (RAM) functions as a work area (temporary storage part) for the CPU 25, and the like.

Here, the substrate process recipe is a recipe in which process conditions, processing procedures, and the like for processing the wafer 200 are defined. In a recipe file, setting values (control values), transmission timings, etc. to be transmitted to the transfer controller 11, the temperature controller 12, the pressure controller 13, the gas supply controller 14, etc. are set for each step of substrate processing.

Further, the main controller 240 according to the embodiment of the present disclosure can be realized using a normal computer system without using a dedicated system. For example, by installing various programs including a control program for executing the above-described process in a general-purpose computer from an external recording medium (flexible disk, CD-ROM, USB, external HDD, etc.) storing the various programs, the main controller 240 that executes the above-described process can be configured.

A means for supplying these various programs is arbitrary. In addition to the means of capable of supplying the various programs via a predetermined recording medium as described above, the various programs may be supplied via, for example, a communication line, a communication network, a communication system, or the like. In this case, for example, a corresponding program may be disclosed on a bulletin board of a communication network, and be provided with it superimposed on a carrier wave via a network. By activating the program provided in this way and executing it in the same manner as other application programs under the control of an OS, the above-described process can be executed.

The process control part 20 has a function of controlling the internal temperature and internal pressure of the process furnace 202, the flow rate of a process gas introduced into the process furnace 202, etc. so that the wafer 200 loaded in the process furnace 202 are subjected to a predetermined process.

The transfer control part 27 has a function of controlling the driving of the transfer mechanisms such as the pod transfer device 118, the wafer transfer mechanism 125, the boat elevator 115, and the like via drive motors (not shown).

The storage 28 has a data storage area 32 in which various data and the like are stored, and a program storage area 33 in which various programs are stored.

The data storage area 32 stores various parameters related to the recipe file. In addition, the data storage area 32 stores information of a delivery position on load port 114 as an I/O stage when the pod 110 is loaded into the housing 111 and when the pod 110 is unloaded out of the housing 111, information of the order of operation when the pod transfer device 118 as a carrier loader is moved to the delivery position, information of the order of operation when the carrier loader 118 is moved from the delivery position, etc. Further, the data storage area 32 stores carrier information including at least a carrier ID that identifies each pod 110, and type information of the wafer 200 in the pod 110.

Further, in the present embodiment, the data storage area 32 stores threshold information 60 of the elapsed time (also referred to as first threshold information), threshold information 61 of the number of password mismatches (also referred to as second threshold information), and threshold information 62 of the number of times of operation stop of the main controller 240 (also referred to as third threshold information), which is one of the setting conditions of the start-up condition execution status information 72.

Furthermore, in the present embodiment, the data storage area 32 stores start-up condition management information 52 as information related to the start-up of the main controller 240. The start-up condition management information 52 stores a management device connection state 70 that stores the state of connection with the management device 600, an operation stop count 71 that records the number of times of operation stop of the main controller 240, the start-up condition execution status information 72 that is used as authentication information when the main controller 240 is started, and operation stop information 73 that has the date and time when the operation of the previous main controller 240 is stopped.

Furthermore, in the present embodiment, the storage 28 can temporarily store the calculated password calculated by the password calculator, and the number of password mismatches that counts the number of mismatches of an input password when password authentication is required when the main controller 240 is started. The counter counts the number of mismatches of the input password.

The program storage area 33 stores, in addition to the above-mentioned substrate process recipe and the like, various programs necessary for loading and unloading a cassette 3, recipes for cleaning the interior of the furnace without substrates, and the like. Further, for example, the program storage area 33 is configured to be capable of storing a software program for performing authentication determination when the main controller is started, which will be described later. In addition, the program storage area 33 is configured to be capable of storing a software program for calculating a password when authentication of the password is required when the main controller is started, which will be described later.

The display 31 of the main controller 240 is provided with a touch panel. The touch panel is configured to display an operation screen for receiving an input of operation commands to the above-described substrate transfer system and substrate processing system. This operation screen includes various display fields and operation buttons for checking the states of the substrate transfer system and the substrate processing system and inputting operation instructions to the substrate transfer system and the substrate processing system. The operation part may have a configuration including at least the display 31 and the input part 29, like an operation terminal (terminal device) such as a personal computer or a mobile device.

The transfer controller 11 is configured to control the transfer operations of the rotary pod shelf 105, the boat elevator 115, the pod transfer device (substrate container transfer device) 118, the wafer transfer mechanism (substrate transfer mechanism) 125, the boat 217, and the rotation mechanism 254, which constitute the substrate transfer system. Further, although not shown, sensors are built in the rotary pod shelf 105, the boat elevator 115, the pod transfer device (substrate container transfer device) 118, the wafer transfer mechanism (substrate transfer mechanism) 125, the boat 217, and the rotation mechanism 254, respectively, which constitute the substrate transfer system. The transfer controller 11 is configured to notify the main controller 240 when each of these sensors indicates a predetermined value or an abnormal value.

Based on a pressure value detected by the pressure sensor 245, the pressure controller 13 is configured to control the pressure regulator 242 so that the internal pressure of the process chamber 201 reaches a desired pressure at a desired timing, and to notify the main controller 240 when the pressure sensor 245 indicates a predetermined value or an abnormal value.

The gas supply controller 14 is configured to control the supply and stop of gases from the process gas supply pipe 232*a* and the purge gas supply pipe 232*b* by opening/closing gas valves (not shown). Further, the gas supply controller 14 is configured to control the MFCs 241*a* and 241*b* so that the flow rate of a gas supplied into the process chamber 201 reaches a desired flow rate at a desired timing. The gas supply controller 14 is configured to notify the main controller 240 when a gas valve (not shown) or a sensor (not shown) installed in the MFCs 241*a* and 241*b* indicates a predetermined value or an abnormal value.

Preferred Embodiments of the Present Disclosure

Next, an embodiment related to the determination of the start-up condition of the main controller will be described with reference to FIGS. 6, 7, 8, 9, and the like. In addition, an embodiment related to the operation stop of the main controller 240 will be described with reference to FIG. 10 and the like. Further, an embodiment related to the setting of the start-up condition execution status information 72 will be described with reference to FIGS. 11, 12, 13, and the like.

Figure 6:
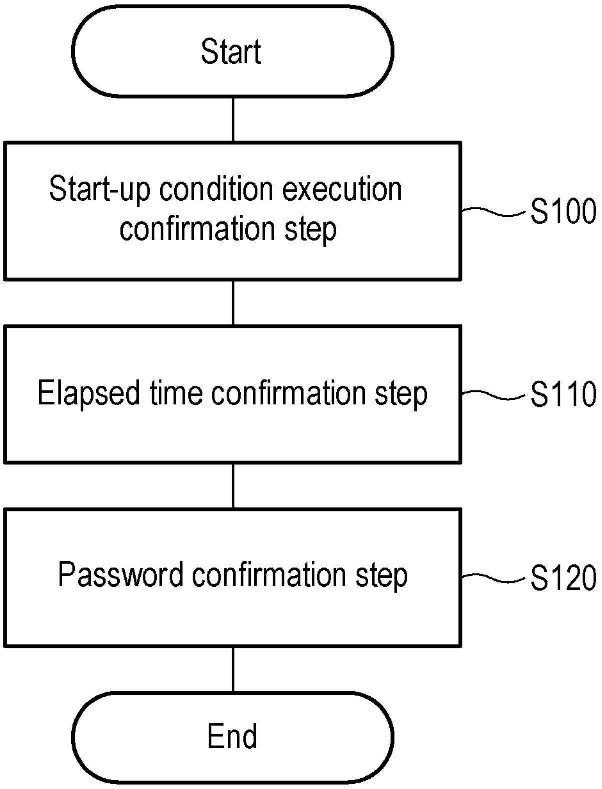
FIG. 6 is an explanatory diagram for explaining each step of a start-up condition execution confirmation flow according to embodiments of the present disclosure.
Figure 7:
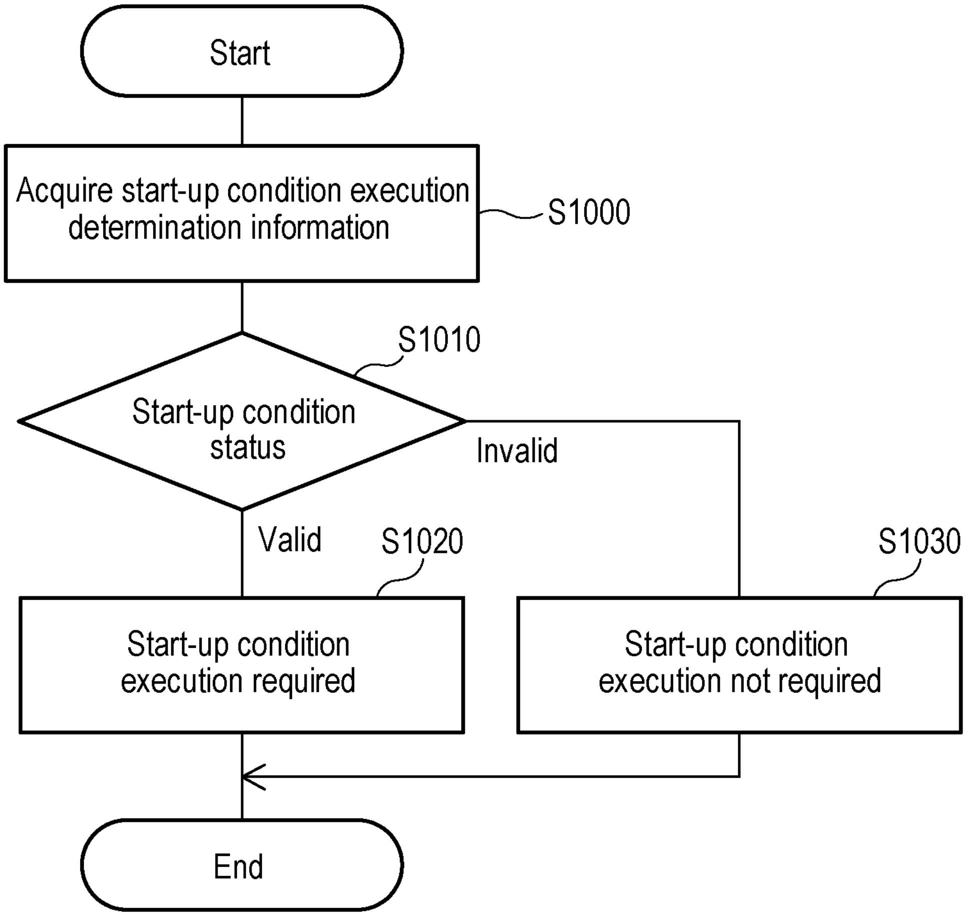
FIG. 7 is a flow diagram of a start-up condition execution confirmation step according to embodiments of the present disclosure.
Figure 8:
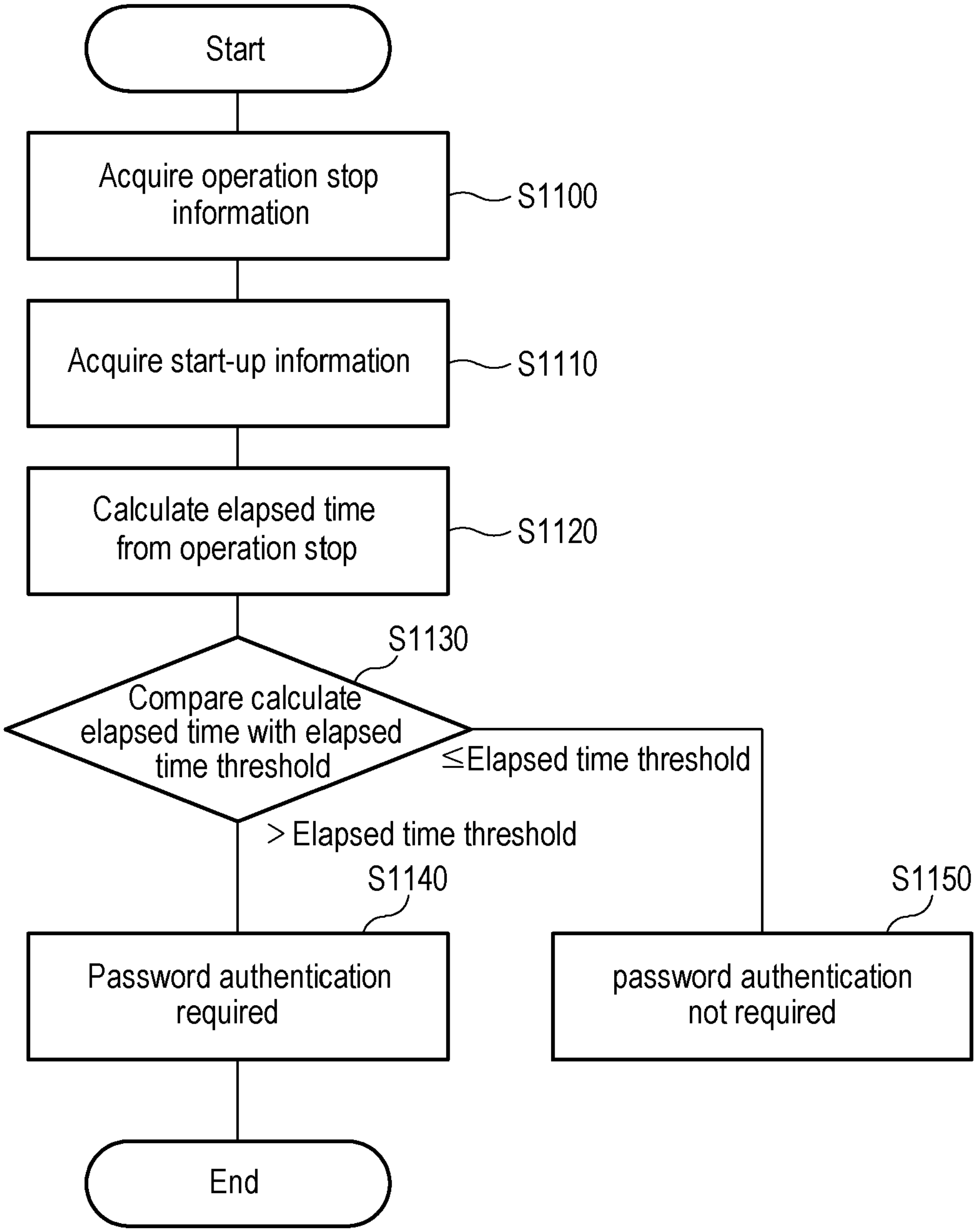
FIG. 8 is a flow diagram of an elapsed time confirmation step according to embodiments of the present disclosure.
Figure 9:
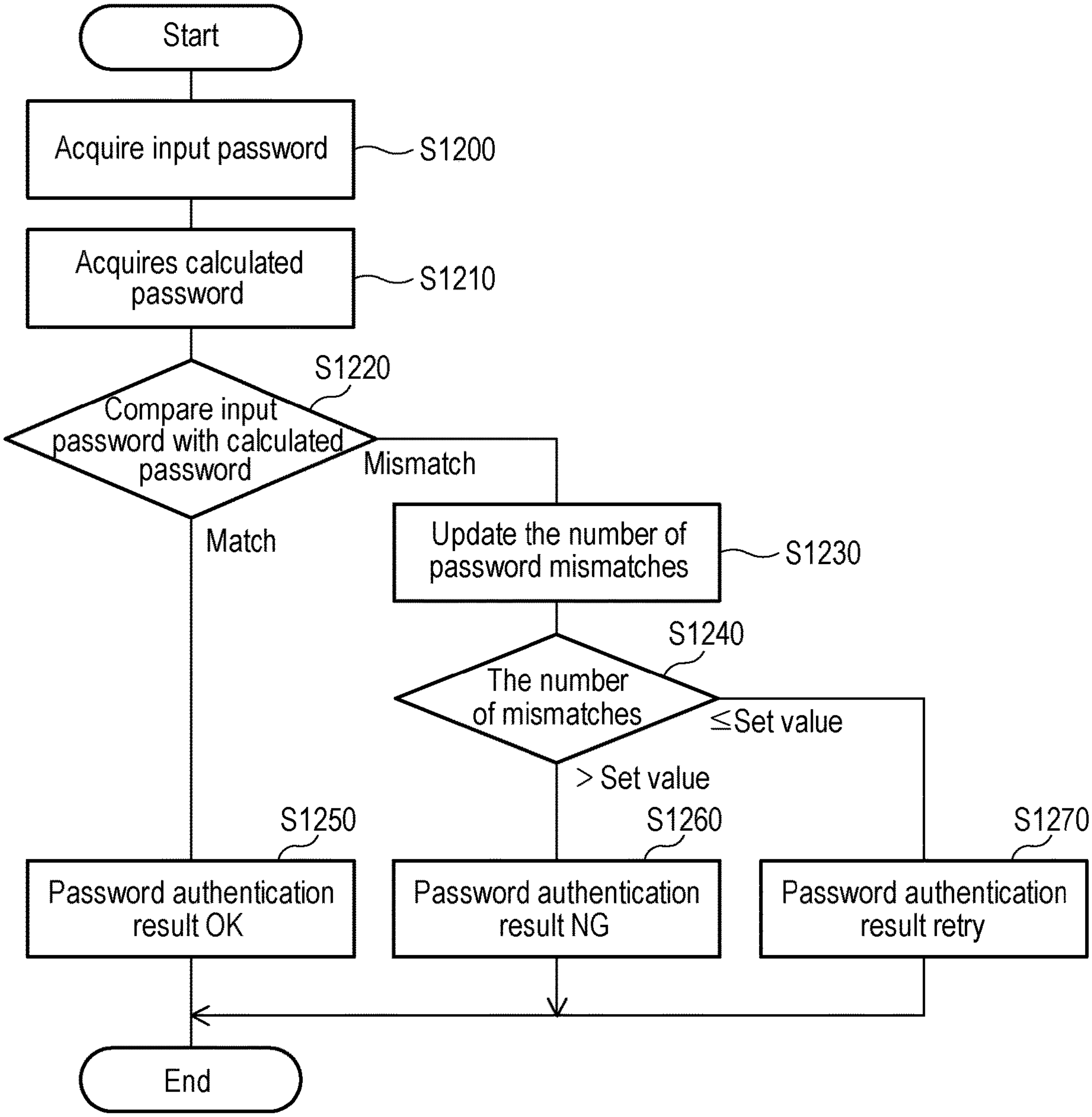
FIG. 9 is a flow diagram of a password confirmation step according to embodiments of the present disclosure.

FIG. 6 shows the operation of executing the start-up condition when the main controller is started. This operation includes, for example, a start-up condition execution confirmation step (S100) of determining whether or not execution of the start-up condition is required, an elapsed time confirmation step (S110) of confirming the elapsed time from the most recent operation stop time of the main controller 240 when it is determined that the execution of the start-up condition is required in the start-up condition execution confirmation step (S100), and a password confirmation step (S120) that is executed when authentication by password input is required.

Start-up Condition Execution Confirmation Step (S100)

Next, the start-up condition execution confirmation step S100 will be described. In the start-up condition execution confirmation step S100, when the main controller 240 is started, the CPU 25 instructs the start-up condition controller 40 to confirm the start-up condition execution. The start-up condition controller 40 performs the start-up condition confirmation operation shown in FIG. 7 according to the instruction of the start-up condition execution confirmation from the CPU 25. The start-up condition controller 40 acquires the setting state of the start-up condition execution status information 72 stored in the data storage area 32 of the storage 28 (S1000) and confirms the acquired start-up condition execution status information 72 (S1010). If the start-up condition execution status information 72 is set to be valid, it is confirmed that authentication is required (S1020), and if the start-up condition execution status information 72 is set to be invalid, it is confirmed that execution of the start-up condition is not required (S1030), and the result confirmed as a start-up condition confirmation result is returned to the CPU 25.

When the CPU 25 determines that the execution of the start-up condition is required based on the confirmed result from the start-up condition controller 40, the CPU 25 instructs the start-up condition controller 40 to confirm the elapsed time.

If the CPU 25 determines that the execution of the start-up condition is not required based on the start-up condition confirmation result from the start-up condition controller 40, the main controller 240 may be started up without performing the following elapsed time confirmation step (S110) and password confirmation step (S120).

Elapsed Time Confirmation Step (S110)

Next, the elapsed time confirmation step S110 will be described. The start-up condition controller 40 performs the elapsed time confirmation operation shown in FIG. 8 according to an instruction of the elapsed time confirmation from the CPU 25. The start-up condition controller 40 acquires the operation stop information 73 stored in the data storage area 32 of the storage 28 (S1100), acquires start-up information of the main controller 240 from the clock function of the main controller (S1110), and calculates the elapsed time from the previous operation stop from the operation stop information 73 and the start-up information (S1120).

Next, the start-up condition controller 40 acquires a first threshold value stored in a parameter storage 51 of the storage 28 and compares it with the elapsed time calculated in the step S1120 (S1130). As a result of the comparison in the step S1130, if the elapsed time calculated in the step S1120 exceeds the first threshold value 60, it is confirmed that password authentication is required (S1140). On the other hand, if the elapsed time calculated in the step S1120 is equal to the first threshold value 60 or is smaller than the first threshold value 60, it is confirmed that password authentication is not required (S1150), and the result confirmed as an elapsed time confirmation result is returned to the CPU 25.

When the CPU 25 determines that the password authentication is required based on the elapsed time confirmation result from the start-up condition controller 40, the CPU 25 instructs the start-up condition controller 40 to confirm the password.

When the CPU 25 determines that the password authentication is not required based on the confirmed result from the start-up condition controller 40, the main controller 240 may be started up without performing the following password confirmation step (S120).

When the CPU 25 determines that the password authentication is required based on the elapsed time confirmation result from the start-up condition controller 40, the CPU 25 instructs the password calculator 41 to calculate the password. Upon receiving the password calculation instruction from the CPU 25, the password calculator 41 calculates a password that is valid only for the day, and stores it in the data storage area of the storage 28, as a calculated password 82.

The calculated password 82 is valid only during the password confirmation step (S120) and may be deleted from the data storage area 32 of the storage 28 when the password confirmation step (S120) is completed.

When the CPU 25 determines that the password authentication is required based on the elapsed time confirmation result from the start-up condition controller 40, the CPU 25 instructs the input part 29 to input a password. In addition, the CPU 25 instructs the display 31 to display a password request. Upon receiving input of the password, the input part 29 returns the input password to the CPU 25 as an instruction response to the password input request. The CPU 25 passes the input password received from the input part 29 to the start-up condition controller 40.

Password Confirmation Step (S120)

Next, the password confirmation step S120 will be described. The start-up condition controller 40 performs the password confirmation operation shown in FIG. 9 according to an instruction of the password confirmation from the CPU 25. Upon acquiring the input password from the CPU 25 (S1200), the start-up condition controller 40 acquires the calculated password 82 stored in the data storage area 32 of the storage 28 (S1210) and compares the input password with the calculated password 82 (S1220).

Next, as the result of the step S1220, if the start-up condition controller 40 determines that there is a match, the password authentication result is set to OK (S1250) and the determination result is returned to the CPU 25.

As the result of the step S1220, if the start-up condition controller 40 determines that there is no match, the counter 43 adds 1 to the number of password mismatches 83 stored in the data storage area 32 of the storage 28 (S1230).

Next, the start-up condition controller 40 compares the number of password mismatches 83 with a second threshold value 61 stored in a parameter storage area of the storage 28 (S1240). If the start-up condition controller 40 determines that the number of password mismatches 83 exceeds the second threshold value 61, the password authentication result is set to NG (S1260) and the determination result is returned to the CPU 25.

When the start-up condition controller 40 compares the number of password mismatches 83 with the second threshold value 61 stored in the parameter storage area of the storage 28 (S1240), if the start-up condition controller 40 determines that the number of password mismatches 83 is equal to the second threshold value 61 or is smaller than the second threshold value 61, the password authentication result is set to retry (S1270) and the determination result is returned to the CPU 25.

The CPU 25 determines the password authentication result from the start-up condition controller 40, and if the password authentication result is OK, the CPU continues the start-up of the main controller.

Figure 10:
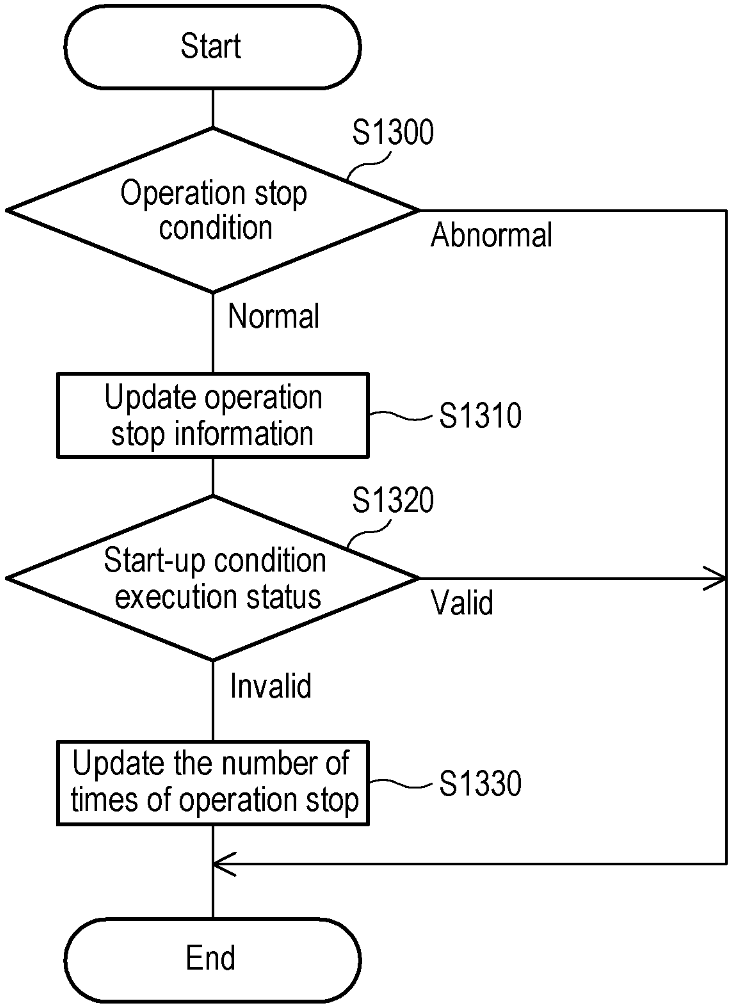
FIG. 10 is a flow diagram of a main controller operation stop step according to embodiments of the present disclosure.

When the CPU 25 determines the password authentication result from the start-up condition controller 40, and if the password authentication result is NG, the CPU instructs the display 31 to display a message that the start-up is not possible, and then performs the operation stop of the main controller 240 shown in FIG. 10.

The CPU 25 determines the password authentication result from the start-up condition controller 40, and if the password authentication result is retry, the CPU instructs the input part 29 to input the password and the display 31 to display the password again, and repeats the password confirmation step (S120).

Next, an operation stop information updating step when the operation stop of the main controller 240 is performed will be described. In the operation stop information updating step, when the CPU 25 detects the operation stop of the main controller 240, the CPU 25 notifies the start-up condition controller 40 of the operation stop, and the start-up condition controller 40 performs the operation shown in FIG. 10.

(S1300)

For example, the start-up condition controller 40 performs determination of an operation stop state (S1300) to determine whether the operation stop state is a normal state or an abnormal state. Here, the normal state is, for example, a case where the operation stop of the main controller 240 is performed according to a regular procedure, and the abnormal state is, for example, a sudden power failure, a forced power off, or a forced termination due to a failure in the start-up condition execution.

The start-up condition controller 40 does nothing and notifies the CPU 25 of continuing the operation stop of the main controller 240 if the operation stop state (S1300) determination is an abnormal state.

(S1310)

If it is determined that the operation stop state (S1300) is normal, the start-up condition controller 40 acquires operation stop date and time information of the main controller 240 by the clock function of the main controller 240 and stores it in the operation stop information 73 of the storage 28.

(S1320)

Next, the start-up condition controller 40 acquires the start-up condition execution status information 72 stored in the storage 28 and checks whether the start-up condition execution status information 72 is valid or invalid. If it is valid, the start-up condition controller 40 does nothing and notifies the CPU 25 of continuing the operation of the main controller.

(S1330)

When the start-up condition execution status information 72 is invalid, the counter 43 adds 1 to the operation stop count 71 indicating the number of times of operation stop of the storage 28 and notifies the CPU 25 of continuing the operation stop of the main controller.

Figure 11:
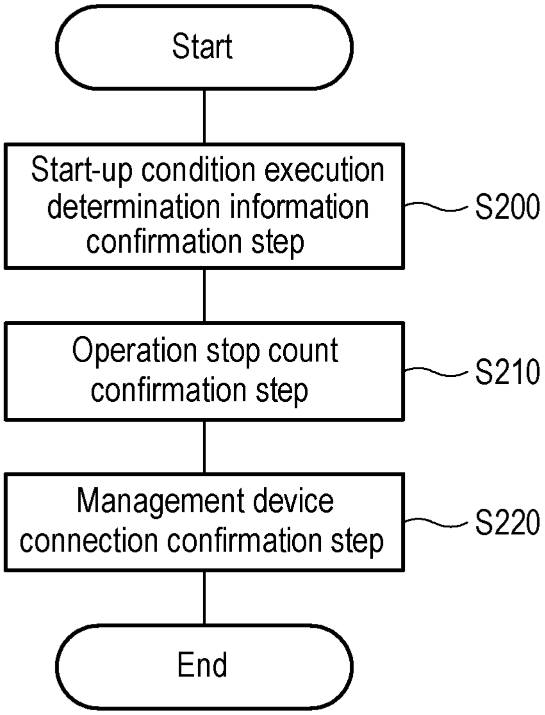
FIG. 11 is an explanatory diagram for explaining each step of a start-up condition execution confirmation information setting flow according to embodiments of the present disclosure.

FIG. 11 shows the setting operation of the start-up condition execution status information 72 for performing authentication determination when the main controller 240 is started. The setting operation includes, for example, a start-up condition execution status information confirmation step (S200) of determining whether or not the setting of the start-up condition execution status information 72 is required, an operation stop count confirmation step (S210) of performing the setting determination of the start-up condition execution status information 72 from the operation stop count 71 stored in the storage 28, and a management information connection confirmation step (S220) of performing the setting determination of the start-up condition execution status information 72 from the management device connection state 70 stored in the storage.

Start-Up Condition Execution Status Information Confirmation Step (S200)

Next, the start-up condition execution status information confirmation step S200 will be described. In the start-up condition execution status information confirmation step S200, according to an instruction from the CPU 25, the start-up condition controller 40 acquires the setting state of the start-up condition execution status information 72 stored in the storage 28 and confirms the acquired start-up condition execution status information 72. If the start-up condition execution status information 72 is set to valid, the start-up condition controller 40 does nothing and returns a response to the CPU 25. When the start-up condition execution status information 72 is set to invalid, the start-up condition controller 40 performs the operation stop count confirmation step (S210).

Operation Stop Count Confirmation Step (S210)

Figure 12:
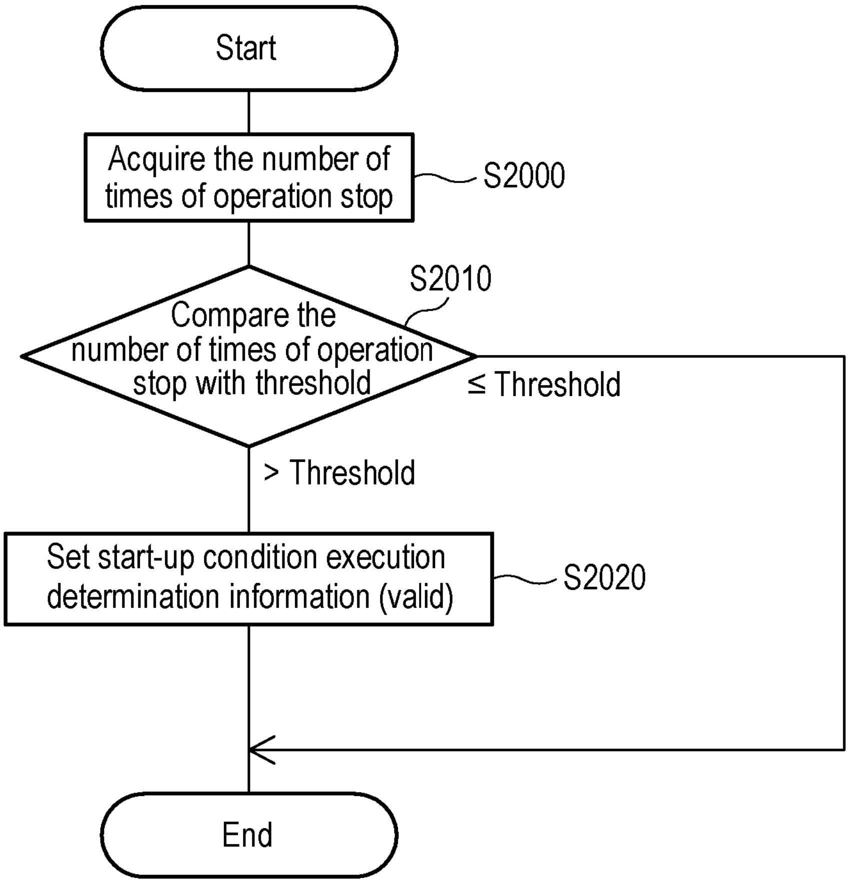
FIG. 12 is a flow diagram of an operation stop count confirmation step according to embodiments of the present disclosure.

Next, the operation stop count confirmation step S210 will be described. In the operation stop count confirmation step S210, the operation stop confirmation operation shown in FIG. 12 is performed. The operation stop count 71 stored in the storage 28 is acquired (S2000), the third threshold information 62 stored in the parameter storage 51 of the storage 28 is acquired, and the operation stop count 71 is compared with the third threshold information 62 (2010).

If the operation stop count 71 is equal to or less than the third threshold information 62, nothing is done and the operation stop confirmation operation ends.

If the operation stop count 71 exceeds the third threshold information 62, the setting state of the start-up condition execution status information 72 is set to valid (S2020) and is stored in the storage 28, and the process exits.

Management Device Connection Confirmation Step (S220)

Figure 13:
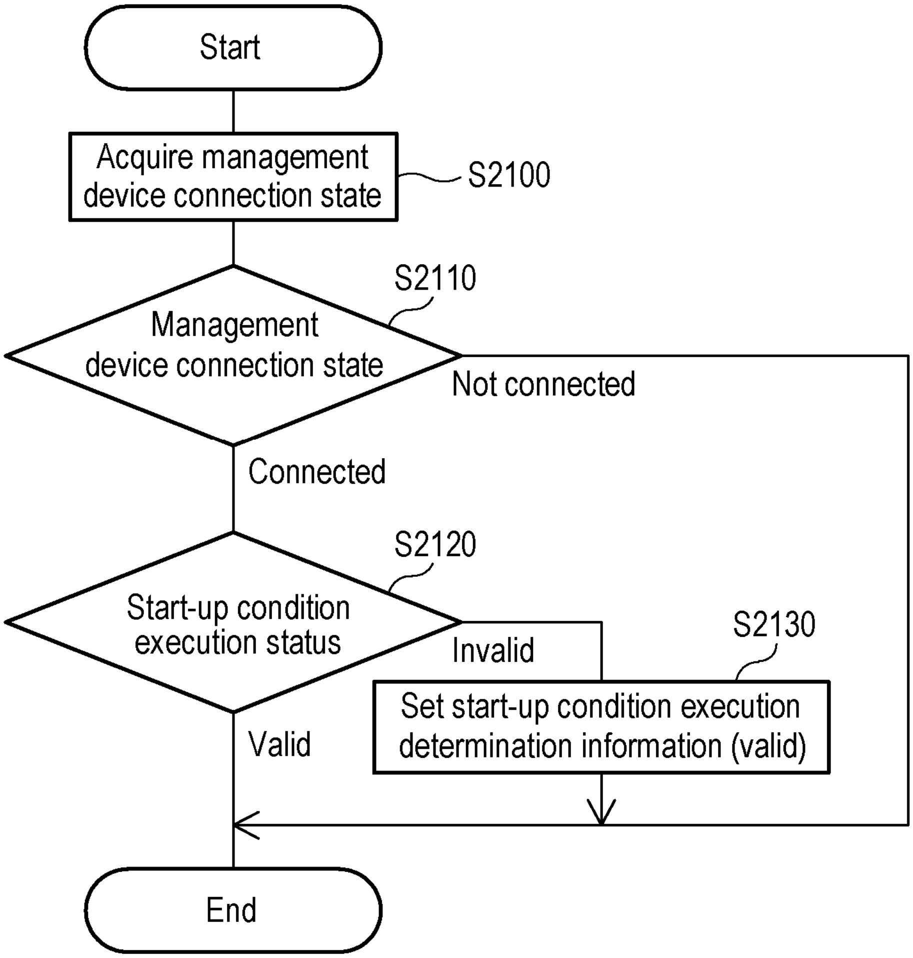
FIG. 13 is a flow diagram of a management device connection confirmation step according to embodiments of the present disclosure.

Next, the management device connection confirmation step S220 will be described. This step is performed when the start-up condition execution status information 72 is not set to valid in the operation stop count confirmation step S210. In the management device connection confirmation step S220, the management device connection confirmation operation shown in FIG. 13 is performed. The management device connection state 70 stored in the storage 28 is acquired (S2100), and the connection state of the management device 600 is confirmed (S2110).

If the management device 600 is in an unconnected state, the management device connection confirmation step S220 is terminated without doing anything. If the management device 600 is in a connected state, the setting state of the start-up condition execution status information 72 is set to valid (S2130) and is stored in the storage 28, and the process exits.

In the present embodiment, by setting the start-up condition execution status information 72, for example, since unnecessary password authentication is not performed at the time of setup before a new device is connected to the management device 600, it is possible to prevent a decrease in work efficiency related to a setup step.

Furthermore, in the present embodiment, by setting the start-up condition execution status information 72, it is possible to prevent work loss in the setup step due to an erroneous operation by an unfamiliar worker and thus prevent a decrease in work efficiency related to the setup step.

Other Embodiments

Although the first embodiment and the second embodiment of the present disclosure have been described above, the present disclosure is not limited to the above-described embodiments, and can be modified in various forms without departing from the gist thereof.

In the above-described embodiments, an example of forming a film using a batch-type substrate processing apparatus 1 that processes a plurality of substrates at once has been described. The present disclosure is not limited to the above-described embodiments, and can also be suitably applied, for example, to a case of forming a film using a single-wafer type substrate processing apparatus that processes one or several substrates at a time. Even when the single-wafer type substrate processing apparatus is used, it is possible to restrict start-up of an apparatus controller by password authentication at the time of start-up and thus prevent the start-up in a state in which the apparatus setup is incomplete. Further, in the above-described embodiments, an example of forming a film using a substrate processing apparatus having a hot-wall type process furnace has been described. The present disclosure is not limited to the above-described embodiments, and can also be suitably applied to a case of forming a film using a substrate processing apparatus having a cold-wall type process furnace.

According to the present disclosure in some embodiments, it is possible to perform efficient setup by preventing an erroneous operation during setup of a substrate processing apparatus.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A substrate processing apparatus comprising:

a process chamber configured to be capable of processing a substrate;

a main controller configured to be capable of controlling the processing of the substrate;

a storage configured to be capable of storing start-up condition execution status information used to determine whether or not a start-up condition is executed when the main controller is started, start-up condition management information for managing the start-up condition, and a state of the start-up condition management information; and a start-up condition controller configured to be capable of validating the start-up condition execution status information when the start-up condition management information satisfies a predetermined condition, and wherein, when the substrate processing apparatus is started-up, the start-up condition controller executes the start-up condition if the start-up condition execution status information is valid, and does not execute the start-up condition if the start-up condition execution status information is invalid.

2. The substrate processing apparatus of claim 1, wherein the start-up condition execution status information is maintained in the storage even when an operation of the main controller is stopped.

3. The substrate processing apparatus of claim 1, wherein the substrate processing apparatus is electrically connected to a management device, and wherein the start-up condition management information is information of the management device which is recognized by the main controller, and the predetermined condition is a case where the recognized information is acquired for the first time.

4. The substrate processing apparatus of claim 1, further comprising: a counter configured to count the number of times of operation stop of the main controller, wherein the start-up condition management information is information of the number of times of operation stop counted by the counter, and wherein the predetermined condition is a case of exceeding a predefined number of times of operation stop of the main controller.

5. The substrate processing apparatus of claim 1, wherein the storage is configured to be capable of updating and storing the start-up condition execution status information according to an instruction from the main controller.

6. The substrate processing apparatus of claim 3, wherein the start-up condition controller is configured to be capable of performing determination of the start-up condition from a connection state with the management device.

7. The substrate processing apparatus of claim 1, wherein the storage is configured to be capable of storing operation stop information of the main controller, and wherein when the start-up condition execution status information is valid, the start-up condition controller is configured to be capable of calculating an elapsed time from an operation stop of the main controller using the operation stop information and start-up information of the main controller and notifying the main controller of a result of comparison with a first threshold which is a pre-defined threshold of the elapsed time.

8. The substrate processing apparatus of claim 1, wherein when the start-up condition execution status information is invalid, the start-up condition controller is capable of notifying the main controller of a continuous operation of the main controller.

9. The substrate processing apparatus of claim 1, wherein when determining that password authentication is required based on a notification from the start-up condition controller, the main controller is capable of instructing an input part, which performs an operation of the main controller, to request an input of a password.

10. The substrate processing apparatus of claim 9, wherein the main controller includes a display capable of displaying a state of the substrate processing apparatus, and is capable of instructing the display to display a password request.

11. The substrate processing apparatus of claim 1, wherein the main controller further includes a password calculator capable of calculating a password and outputting a calculation password that is the calculated password, and wherein the main controller is capable of instructing the password calculator to output the calculation password.

12. The substrate processing apparatus of claim 11, wherein the storage is capable of storing the calculation password only when the main controller is in operation.

13. The substrate processing apparatus of claim 11, wherein the start-up condition controller is capable of receiving an input password, which is input by an input part, confirming a match with the calculation password, and notifying the main controller of a password authentication result.

14. The substrate processing apparatus of claim 13, wherein the start-up condition controller is capable of counting the number of mismatches when the input password and the calculated password are mismatched, and notifying the main controller that the operation of the main controller is not possible when the number of mismatches exceeds a predetermined second threshold.

15. The substrate processing apparatus of claim 13, wherein the main controller receives the password authentication result and if the operation of the main controller is not possible, stops the operation of the main controller.

16. The substrate processing apparatus of claim 13, wherein the main controller receives the password authentication result and if the operation of the main controller is not possible, the main controller is capable of instructing a display to display a message indicating that the operation of the main controller is not possible.

17. An apparatus start-up method comprising:

storing start-up condition execution status information used as authentication information when an apparatus is started, and start-up condition management information for managing a condition for validating the start-up condition execution status information;

monitoring an operation state of the apparatus; and validating the start-up condition execution status information when the condition managed by the start-up condition management information is satisfied by referring to the start-up condition management information, and wherein, when the apparatus is started-up, the start-up condition is executed if the start-up condition execution status information is valid, and the start-up condition is not executed if the start-up condition execution status information is invalid.

18. The apparatus start-up method of claim 17, further comprising: when the apparatus is started, determining whether or not a password is requested based on the start-up condition execution status information and an elapsed time from apparatus operation stop.

19. A method of manufacturing a semiconductor device, comprising:

the apparatus start-up method of claim 17; and processing a substrate.

20. A non-transitory computer-readable recording medium storing a program that causes a computer to perform the apparatus start-up method of claim 17.

* * * * *